April 5, 1955     L. D. BAKKE ET AL     2,705,481
INDUCTION SYSTEM FOR 2-CYCLE INTERNAL COMBUSTION ENGINE
Filed April 26, 1954     3 Sheets-Sheet 3
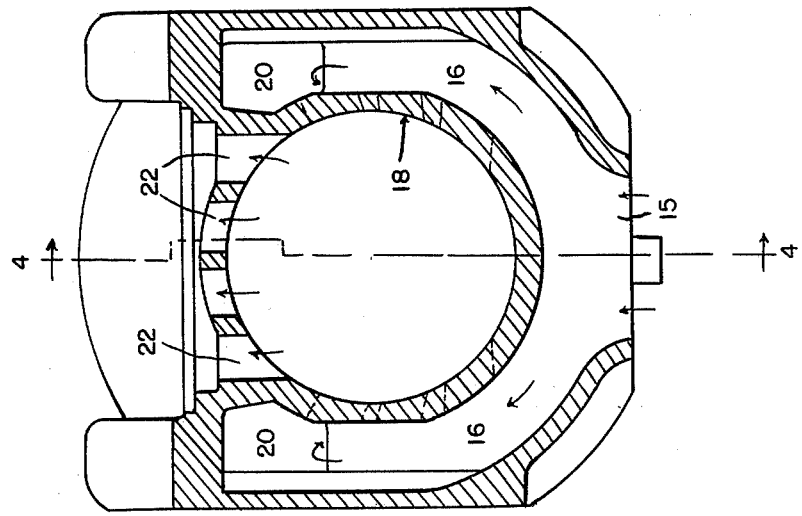
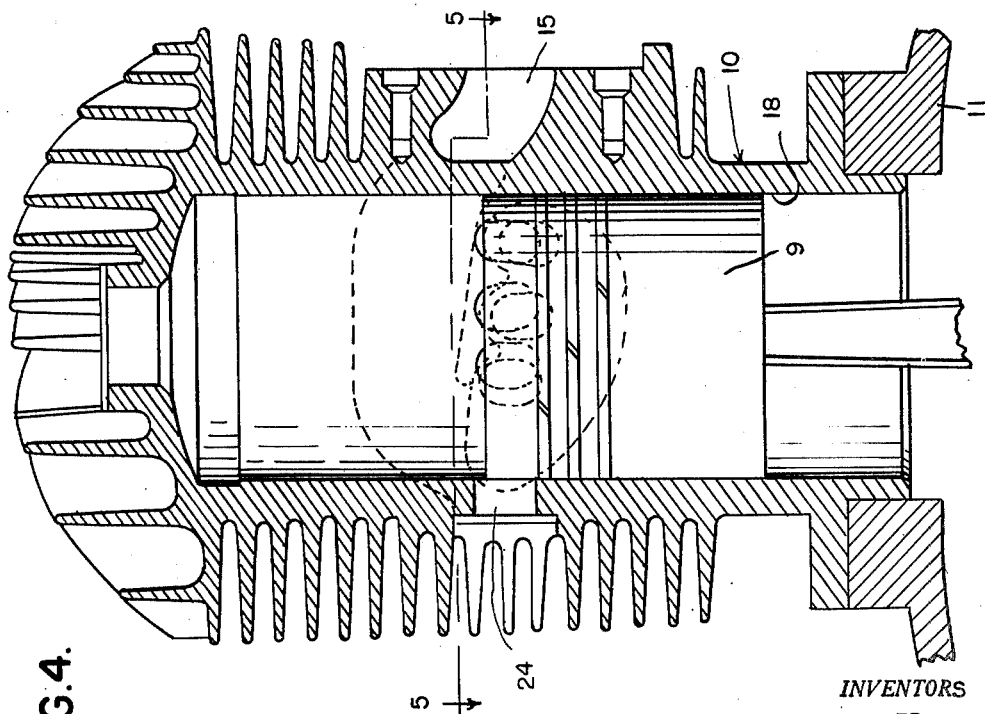
INVENTORS
MERLIN J. MILLER
BY    LAURENCE D. BAKKE
*Hauke + Harderty*
ATTORNEYS United States Patent Office 2,705,481
Patented Apr. 5, 1955

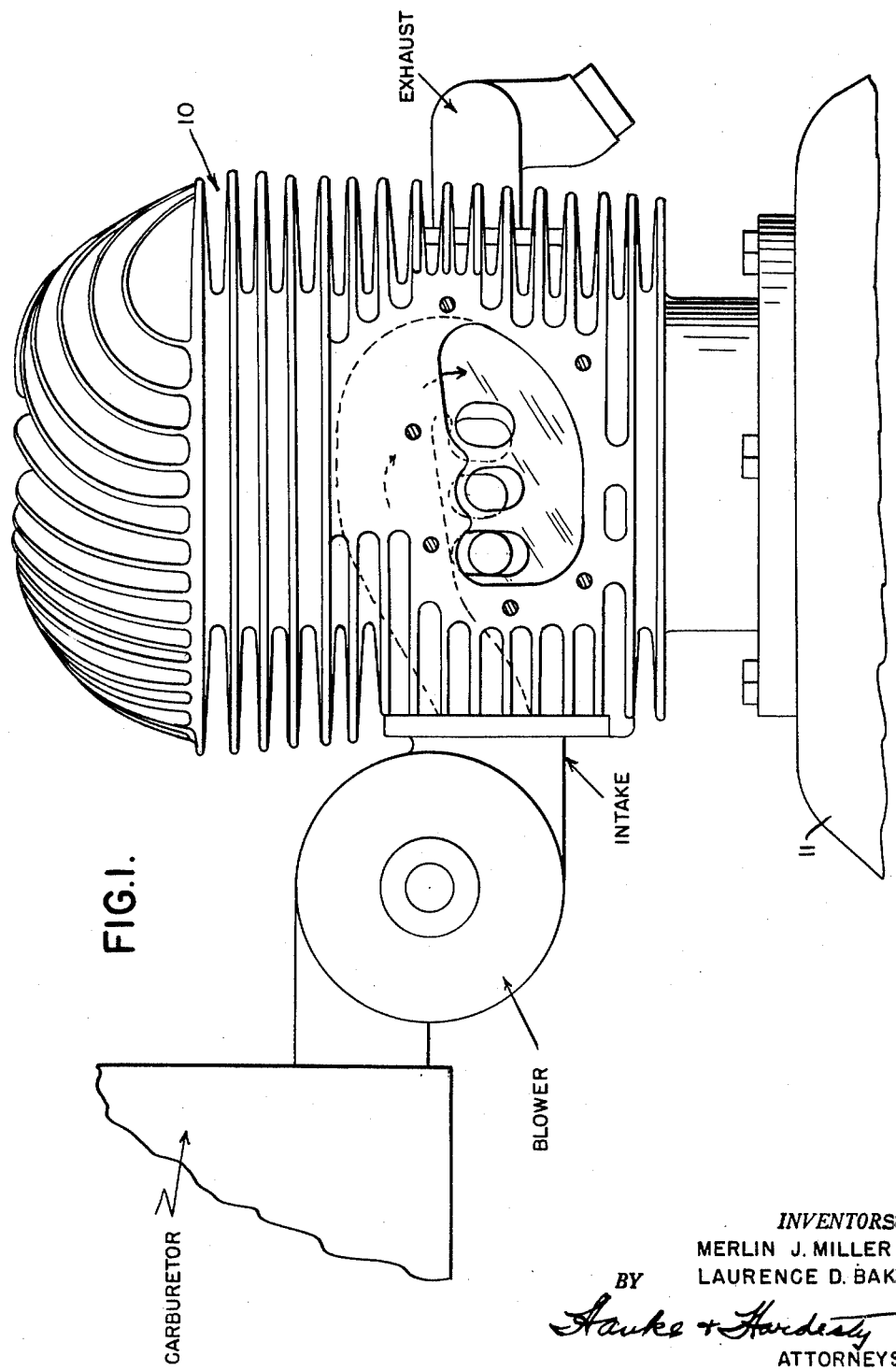

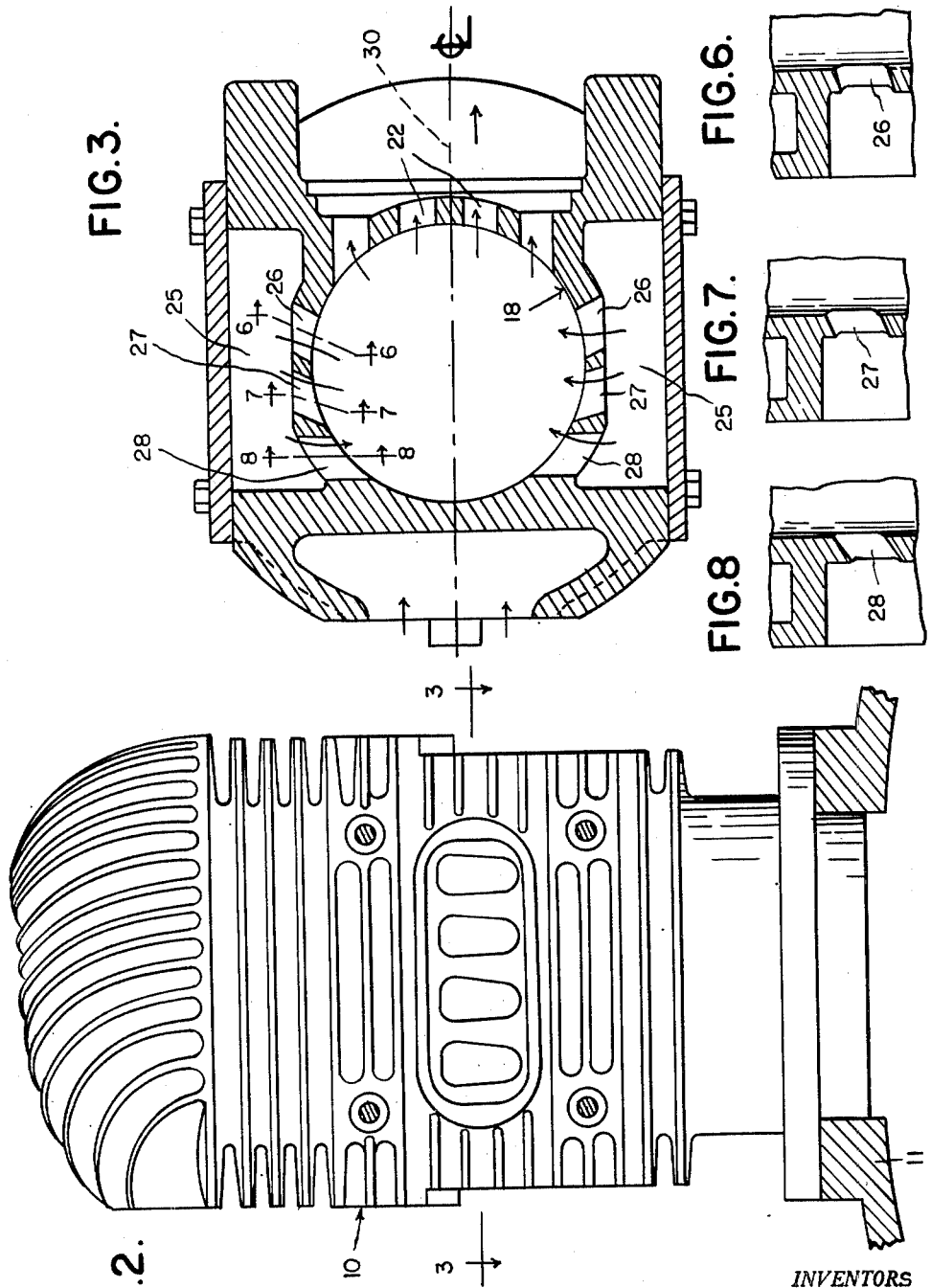

2,705,481

INDUCTION SYSTEM FOR 2-CYCLE INTERNAL COMBUSTION ENGINE

Laurence D. Bakke, Plymouth, and Merlin J. Miller, Brighton, Mich., assignors to Continental Motors Corporation, Detroit, Mich., a corporation of Virginia Application April 26, 1954, Serial No. 425,644

5 Claims. (Cl. 123—65)

Our invention relates to internal combustion engines and more particularly to the porting construction for a 2-cycle engine and to an improved induction and scavenging system therefor.

In this type of engine, whether of the spark ignition or compression ignition type, the complete scavenge of the products of combustion is a problem with which engineers have dealt and many solutions to the problem have been heretofore proposed and constructed. In seeking to improve the operation of a 2-cycle internal combustion engine, various means have been tried, some having been relatively successful and others not so satisfactory.

It is an object of our present invention to improve the performance of a 2-cycle internal combustion engine by the construction and provision of an improved induction system therefor, whereby to obtain an efficient and improved scavenging of the engine cylinder.

A further object of our invention is to obtain improved operating characteristics of a 2-cycle engine induction system by constructing the cylinder intake and exhaust ports so as to obtain an improved induction of a fuel mixture and an improved scavenging of the engine cylinder.

For a more detailed understanding of our invention, reference may be had to the accompanying drawings illustrating a preferred modification thereof, wherein like parts are referred to by like reference characters throughout the several views, and in which Fig. 1 is a side elevational view of an engine embodying the principles of our invention, but showing the side plate removed therefrom to show the intake port design.

Fig. 2 is an end view thereof showing the exhaust ports.

Fig. 3 is a plan sectional view through the cylinder intake and exhaust ports taken substantially on the line 3—3 of Fig. 2.

Fig. 4 is a vertical sectional view of the engine taken on the line 4—4 of Fig. 5.

Fig. 5 is a horizontal sectional view taken substantially on the line 5—5 of Fig. 4, and Figs. 6, 7 and 8 are fragmentary detail sectional views taken respectively along the lines 6—6, 7—7 and 8—8 of Fig. 3.

The internal combustion engine of the 2-cycle type as herein illustrated comprises in general a cylinder block 10 having a cylinder head portion and a crankcase structure 11 to which said cylinder block is bolted or otherwise secured. Fig. 1 of the drawings illustrates a general side elevational view of this engine and illustrates diagrammatically a carburetor 12 and a blower 13 for injecting a carbureted mixture of fuel and air to the engine under a few pounds of pressure. Any type of suitable blower may be utilized for this purpose. The blower preferably delivers the carburetor mixture directly to the intake port 15 of said cylinder block.

The induction system of this engine generally comprises a divided fuel mixture conducting portion comprising a pair of branches 16 extending alongside opposite sides of the engine cylinder 18 and disposed generally in a horizontal engine plane (see Figs. 4 and 5). Said branches each openly communicate with a vertical passage 20 or duct located adjacent to that side of the engine block close by the cylinder exhaust ports 22 that communicate with the exhaust outlet passage 24. These vertical passages or ducts 20 openly connect the branch passages 16 respectively with the chambers 25 disposed on opposite sides of said cylinder 18 (see Fig. 3).

A series of cylinder inlet ports 26, 27 and 28 are disposed respectively on opposite sides of the cylinder and are so constructed and arranged to direct the fuel mixture to flow inwardly of the cylinder in converging secant lines lying for the most part within approximately the one half of the engine cylinder remote from said cylinder exhaust ports. It will be noted that the direction of gas flow from intake ports 28 is generally in a vertical plane extending substantially normal to the vertical engine plane 30 extending through the intake port 15, through the solid back wall of the cylinder, remote from the exhaust ports and substantially medially of the series or group of exhaust ports 22. The exhaust ports 22 are angularly spaced and are disposed substantially in a common horizontal engine plane while said intake ports 26, 27 and 28 are also angularly spaced and disposed generally in another horizontal engine plane. It may also be noted that the top edges of the exhaust ports are slightly higher with respect to the top edges of said cylinder intake ports so that on the downward travel of the piston 9 in the cylinder 18 the exhaust ports are uncovered first and on the upward travel of said piston in said cylinder said exhaust ports are the last to close. This is substantially general practice in 2-cycle engines and the timing of the opening and closing of said intake and exhaust ports is determined so that there shall be no waste of the combustible mixture as said cylinder is scavenged of the products of combustion. The intake ports 27 direct the incoming mixture in a direction converging on the gas injected through ports 28, and likewise ports 26 are inclined to converge the gas injected therethrough in a direction converging on the gas injected through ports 27 and 28.

The ports 26, 27 and 28 on both sides are constructed substantially identical. The ports are also inclined to the horizontal to direct the incoming combustible mixture towards the top of the engine cylinder away from the exhaust ports. Such ports are progressively steeper or sloped at a progressively increasing angle to the horizontal away from the exhaust ports, thus ports 26 are designed to be inclined at an angle of about ten degrees to the horizontal, ports 27 at an angle of about twenty-five degrees, and ports 28 at an angle of about forty degrees to the aforesaid horizontal engine plane.

Thus following ignition of the combustible mixture in the engine cylinder, the piston is forced inwardly of the cylinder on the power stroke, the exhaust ports are uncovered to exhaust the products of combustion and shortly thereafter the intake ports 26, 27 and 28 are opened. Because of the construction of these intake ports the incoming fresh gas sweeps upwardly of the cylinder and initially away from the exhaust ports and then is looped back and moves toward the exhaust ports sweeping said products of combustion before it. The blower provides an initial pressure of only a few pounds and this pressure is so coordinated with the cylinder capacity and with respect to the timing of the closing of all said ports, that the engine cylinder is substantially 100% scavenged of all products of combustion when said exhaust ports are finally closed, and it is planned that practically none of the fresh gases are wasted.

It will be apparent to those skilled in the art to which our invention relates that various changes and modifications may be made herein without departing from the spirit of our invention or from the scope of the appended claims.

We claim:

1. In an induction system for a 2-cycle internal combustion engine, a cylinder block provided with a fluid induction passage and an intake port, said block having a cylinder and a series of cylinder intake ports located on opposite sides of the cylinder, said induction passage comprising chambers disposed alongside said cylinder and each chamber openingly communicating with one of the series of cylinder intake ports, and divided passage portions connected with said cylinder block intake port and overlying said chambers and terminating in downwardly extending portions connected with said chambers at the ends thereof remote from said cylinder block intake port, and cylinder exhaust port means located in said cylinder medially of said oppositely located series of cylinder intake ports in the cylinder wall portion lying most remote from said cylinder block intake port, and a piston operable in said cylinder controlling all of said cylinder ports.

2. In an induction system for a 2-cycle internal combustion engine, a cylinder block provided with an induction passage and an intake port through which fluid may be introduced into said induction passage, said block having a cylinder and a series of cylinder intake ports located on opposite sides of the cylinder, said induction passage comprising chambers disposed alongside said cylinder and each chamber openly communicating with one of the series of cylinder intake ports, and divided passage portions connected with said cylinder block intake port and overlying said chambers and terminating in downwardly extending portions connected with said chambers at the ends thereof remote from said cylinder block intake port, and cylinder exhaust port means located in said cylinder medially of said oppositely located series of cylinder intake ports in the cylinder wall portion lying most remote from said cylinder block intake port, and a piston operable in said cylinder controlling all said cylinder ports, each of said cylinder intake ports inclined to the horizontal engine plane extending normal to the cylinder axis and angled away from said cylinder exhaust ports to discharge the fluid upwardly in said cylinder whereby to merge said oppositely injected streams of fluid in that portion of the cylinder above the plane of all said intake and exhaust ports and in that half portion of the cylinder remote from said cylinder exhaust ports.

3. In an induction system for a 2-cycle internal combustion engine, a cylinder block having a cylinder provided with a series of horizontally aligned angularly spaced exhaust ports and a series of horizontally aligned angularly spaced intake ports disposed on opposite sides of the cylinder to either side of and angularly spaced from said series of exhaust ports, said cylinder block having induction passages each terminating at one end in a chamber adjacent to and each openly communicating with one of said series of intake ports, said induction passages each comprising an upwardly extending portion connected with one end of a chamber closest to the cylinder exhaust ports and with a generally horizontally extending conducting portion overlying said chamber terminating in a common cylinder block intake port located diametrically opposite said cylinder exhaust ports, said cylinder having a solid wall portion diametrically opposite to said exhaust ports and angularly separating said series of cylinder intake ports and directly facing the cylinder block intake port.

4. In an induction system for a 2-cycle internal combustion engine, a cylinder block having a cylinder provided with a series of horizontally aligned angularly spaced exhaust ports and a series of horizontally aligned angularly spaced intake ports disposed on opposite sides of the cylinder to either side of and angularly spaced from said series of exhaust ports, said cylinder block having fluid induction passages each terminating at one end in a chamber adjacent to and each openly communicating with one of said series of intake ports, said induction passages each comprising an upwardly extending portion connected with one end of a chamber lying closest to the cylinder exhaust ports and with a generally horizontally extending conducting portion overlying said chamber terminating in a common cylinder block intake port located diametrically opposite to said cylinder exhaust ports, said cylinder having a solid wall portion diametrically opposite to said exhaust ports and angularly separating said series of cylinder intake ports and directly facing the cylinder block intake port, each of said series of cylinder intake ports comprising a plurality of angularly spaced ports arranged to direct the fluid inwardly of the cylinder in converging secant lines lying within approximately one-half of the cylinder remote from said exhaust ports, said cylinder intake port most remote from said cylinder exhaust ports having an axis inclined at an angle to the horizontal plane of said ports, said other cylinder intake ports having a progressively reduced angle of inclination to said horizontal plane of said ports.

5. In an induction system for a 2-cycle internal combustion engine, a cylinder block having a cylinder provided with a series of horizontally aligned angularly spaced exhaust ports and a series of horizontally aligned angularly spaced intake ports disposed on opposite sides of the cylinder to either side of and angularly spaced from said series of exhaust ports, said cylinder block having fluid induction passages each terminating at one end in a chamber adjacent to and each openly communicating with one of said series of intake ports, said induction passages each comprising an upwardly extending portion connected with one end of a chamber lying closest to the cylinder exhaust ports and with a generally horizontally extending conducting portion overlying said chamber terminating in a common cylinder block intake port located diametrically opposite to said cylinder exhaust ports, said cylinder having a solid wall portion diametrically opposite to said exhaust ports and angularly separating said series of cylinder intake ports and directly facing the cylinder block intake port, each of said series of cylinder intake ports comprising a plurality of angularly spaced ports arranged to direct the fluid inwardly of the cylinder in converging secant lines lying within approximately one-half of the cylinder remote from said exhaust ports, said cylinder intake port most remote from said cylinder exhaust ports having an axis inclined at an angle to the horizontal plane of said ports, said other cylinder intake ports having a progressively reduced angle of inclination to said horizontal plane of said ports, the aforesaid cylinder intake port most remote from said exhaust ports having an axis lying in a vertical engine plane extending substantially normal to the vertical engine plane extending through said cylinder block intake port and bisecting said solid wall portion and said series of exhaust ports.

References Cited in the file of this patent

UNITED STATES PATENTS

| | | |
|---|---|---|
| 2,038,271 | Curtis | Apr. 21, 1936 |
| 2,477,712 | Anderson | Aug. 2, 1949 |
| 2,504,243 | Anderson | Apr. 18, 1950 |